United States Patent [19]
McGee

[11] 3,834,480
[45] Sept. 10, 1974

[54] HYDRAULIC TRAILER STEERING AND SWAY CONTROL MECHANISM

[76] Inventor: Leland T. McGee, Rt. No. 1, Box 69E, Fort Jones, Calif. 96032

[22] Filed: Dec. 8, 1972

[21] Appl. No.: 313,503

[52] U.S. Cl. ......... 180/79.2 B, 280/DIG. 9, 280/463
[51] Int. Cl. ........................... B60d 3/00, B62d 5/06
[58] Field of Search ..... 180/79.2 B, 79.2 C, 79.2 R; 280/DIG. 9, 463, 468

[56] References Cited
UNITED STATES PATENTS

| | | | |
|---|---|---|---|
| 2,510,525 | 6/1950 | Smart et al. .................... | 280/DIG. 9 |
| 3,414,072 | 12/1968 | Hodges et al. .............. | 180/79.2 B X |
| 3,724,585 | 4/1973 | Conrad .......................... | 180/79.2 C |
| 3,740,874 | 6/1973 | Boschung....................... | 180/79.2 R |

Primary Examiner—David Schonberg
Assistant Examiner—John A. Pekar
Attorney, Agent, or Firm—Whann & McManigal

[57] ABSTRACT

Automatic trailer steering and sway control mechanism in which the wheel guiding means of the tow vehicle operates through a hydraulic steering cylinder having coupled relation with a hydraulic steering cylinder on the pulling tongue of the trailer such that the tow vehicle and trailer vehicle become a coordinated and synchronized unit in which the trailer is stabilized by being steered, rather than dragged, in the proper and more efficiently desired direction in response to guiding changes in the direction of travel of the tow vehicle.

5 Claims, 4 Drawing Figures

PATENTED SEP 10 1974　　　　　　　　　　3,834,480

3,834,480

HYDRAULIC TRAILER STEERING AND SWAY CONTROL MECHANISM

PRIOR ART

In the prior art there are numerous examples showing the use of one or more hydraulic cylinders for changing the relative angular direction between the guiding wheels of a tractor and associated pivotally coupled trailer. The closest art known to applicant are the following patents:

| | | |
|---|---|---|
| 2,316,397 | — | April 13, 1943 |
| 2,470,383 | — | May 17, 1949 |
| 2,833,557 | — | May 6, 1958 |
| 3,124,371 | — | March 10, 1964 |

BACKGROUND OF THE INVENTION

The present invention relates generally to the field of wheeled vehicles.

In its broad aspects, the present invention is concerned with an automatic steering mechanism for coordinating and synchronizing the controlled guided movements of a tow vehicle such as may be exemplified by a conventional four-wheeled automobile, with controlled guided movements of a trailer vehicle such as may be exemplified by a trailer of the travel type having rear supporting wheels and a fixed pulling tongue which is pivotally connected to the tow vehicle by means of a conventional hitch containing the usual "ball and socket" connection.

In order that the present invention may be best understood, it will be appreciated that arrangements such as just described embody steering and stabilizing problems of a different character than those inherently present in the case of tractor-towed implements and trailers of the type in which the forward end of the trailer is supported by a "fifth wheel" upon the tow vehicle.

It has been known heretofore from the above-mentioned U.S. Pat. Nos. 2,316,397 and 3,124,371 to utilize a power cylinder for swinging a trailer tongue which is connected to the trailer by a pivotal connection in order to steer the trailer independently of the tow vehicle to one side or the other and locked, while the tow vehicle continues on a straight course.

The mechanism of the present invention differs from these arrangements in that the tongue of the trailer vehicle is fixed and the pressurized hydraulic fluid does not lock the actuating power cylinders in the adjusted positions, and when the steering wheel of the tow vehicle is released the hydraulic fluid pressure acting in the power cylinders will also be released.

The arrangements in the above mentioned U.S. Pat. Nos. 2,470,383 and 2,833,557, in which the trailer is connected with the tow vehicle or tractor by a fifth wheel or its equivalent, utilize fluid cylinder devices for locking the trailer in a desired angular relation to the tractor vehicle and operate to hydraulically oppose "jack-knifing". The control of the fluid pressure cylinders is independent of the guiding or steering operations of the tow or tractor vehicle.

In the present invention, the power cylinder of the steering mechanism of the tow vehicle and the power cylinder for guiding the tongue of the trailer vehicle are interconnected so as to synchronize the guiding operation of the trailer with the guiding operation of the tow vehicle in a manner to stabilize the trailer and relieve side pull on the rear wheels of the tow vehicle, whereby maneuverability is materially augmented.

SUMMARY OF THE INVENTION

The present invention relates generally to the operation of a tow vehicle and coupled trailer vehicle combination, and is more particularly concerned with mechanism for guidingly steering the trailer and tow vehicles as a coordinated and synchronized unit.

One object of the herein described invention is to provide a simplified mechanism for automatically guidingly steering a trailer vehicle in response to the steering operations of the tow vehicle to which it is coupled, in a manner to augment the maneuverability of the combination and stabilize trailer sway.

A further object is to provide mechanism according to the foregoing object in which the tow vehicle comprises a conventional automobile and which makes use of the power steering components as conventionally provided in the automobile.

Another object of the herein described invention is to provide a hydraulic power cylinder for automatically swinging the fixed tongue of a trailer vehicle on the pivot connection of the trailer vehicle hitch which couples the trailer tongue with the tow vehicle, and in which energization of the power cylinder is controlled by the steering mechanism of the tow vehicle.

Further objects and advantages of the invention will be brought out in the following part of the specification, wherein detailed description is for the purpose of fully disclosing a preferred embodiment of the invention without placing limitations thereon.

BRIEF DESCRIPTION OF THE DRAWINGS

Referring to the accompanying drawings, which are for illustrative purposes only.

DESCRIPTION OF THE PREFERRED EMBODIMENT

Figure 1:
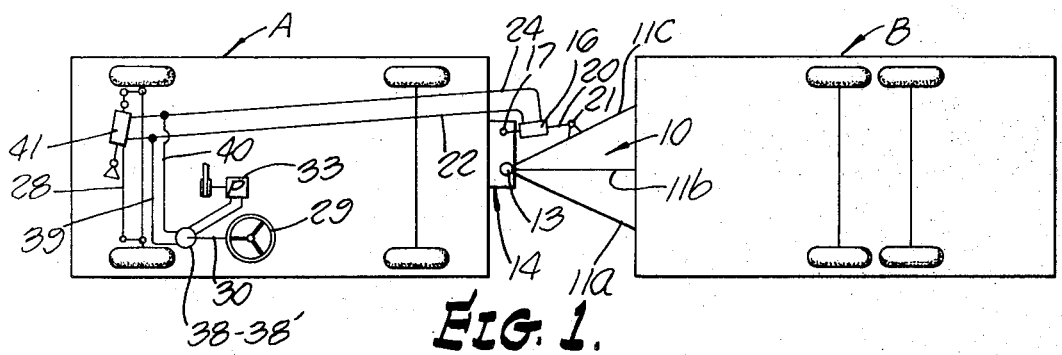
FIG. 1 is a plan view of a tow vehicle and trailer vehicle according to the present invention, and diagrammatically illustrating the hydraulic trailer steering and sway control mechanism.
Figure 3:
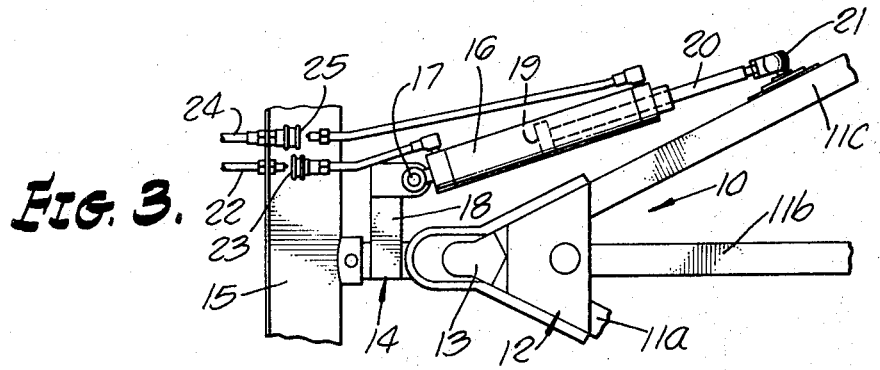
FIG. 3 is an enlarged fragmentary plan view illustrating the details of the hydraulic steering and stabilizing cylinder actuator as used in the present invention for swinging the fixed trailer tongue on the ball and socket connection of the trailer hitch.

Referring more specifically to the drawings, there is illustrated in FIG. 1 a tow vehicle A and a trailer vehicle B, the latter having a fixed tongue structure 10 in which forwardly converging frame members 11a, 11b and 11c are connected with a coupling device 12.

The coupling device 12 is of conventional construction and includes a ball and socket connector of conventional construction for coupling with a complimentary connector of a conventional trailer hitch as generally indicated at 14; this trailer hitch being secured to the rear bumper or rear frame member 15 of the tow vehicle.

Steering movements of the trailer vehicle are controlled by a double acting hydraulic steering cylinder 16, which is swingably connected at one end for horizontal swinging movement on a pivot 17 at the outer end of a bracket structure 18 which supports the pivot in lateral offset relation to the ball and socket connection of the trailer hitch.

Operatively associated with the cylinder 16 is a piston 19, this piston being connected with a power delivery piston rod 20 having its outermost end connected through a universal swivel connector 21 with the adjacent tongue frame member 11c. One end of the cylinder 16 is connected with a hydraulic line 22 through a break-away coupling 23, and the other end of the cylinder connects with a hydraulic line 24 through a break-away coupling 25.

The tow vehicle utilizes conventional steering which includes front wheel steering linkages 26 and 27 that are interconnected by a tie rod 28 in the usual manner. A steering wheel 29 in the usual arrangement has a shaft which is connected with a rotatable shaft 30 of a steering gear device, as generally indicated at 31, which usually contains a worm and gear mechanism for transmitting the rotary movement of the shaft 30 to a pitman 32, the outermost end of this pitman being pivotally connected with the tie rod by a suitable connection for transmitting steering movements to the front wheel linkages.

It is a feature of the present invention that it utilizes the power steering system of the tow vehicle. The power steering system may embody different physical arrangements in towing vehicles of different manufacturers. Basically, whatever system is used, it utilizes a hydraulic pump, as indicated at 33, with an appropriate belt and pulley driving connection with the engine of the vehicle. As usually arranged, the pumping unit is provided with an oil reservoir 35 which is connected through appropriate supply and return conduits 36 and 37 with a steering control valve 38. The valve 38 is actuated by the pitman 32 through a connection so that the valve will operate in response to steering movement to supply and return hydraulic fluid through conduits 39 and 40 having connection with the opposite ends of the double acting hydraulic power actuating cylinder 41. One end of this cylinder is connected through a universal joint connection 42 with the tie rod 28. A piston 43 operative within the cylinder 41 is connected with a piston rod 44 having its outer end connected by a suitable universal joint connection 45 with a front frame member 46 of the vehicle chassis.

Figure 2:
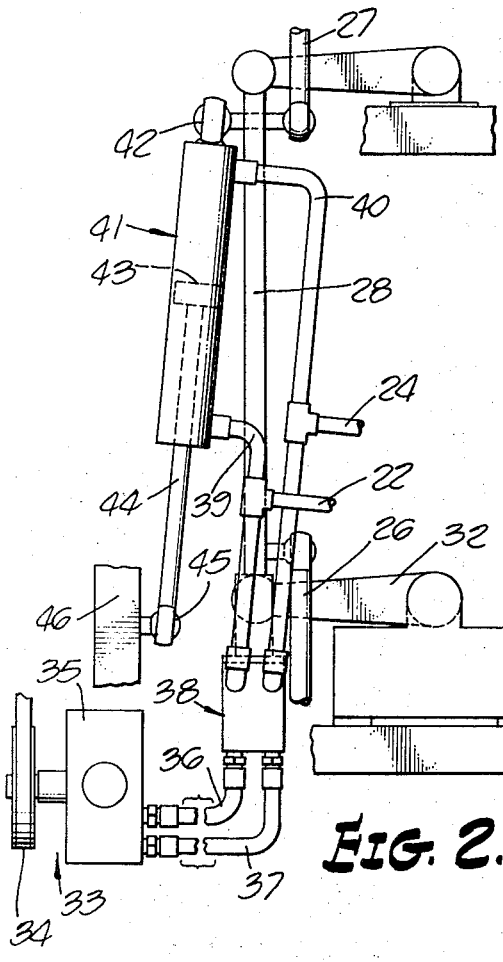
FIG. 2 is an enlarged fragmentary plan view illustrating one type of power steering mechanism on a tow vehicle as utilized in connection with the present invention.
Figure 4:
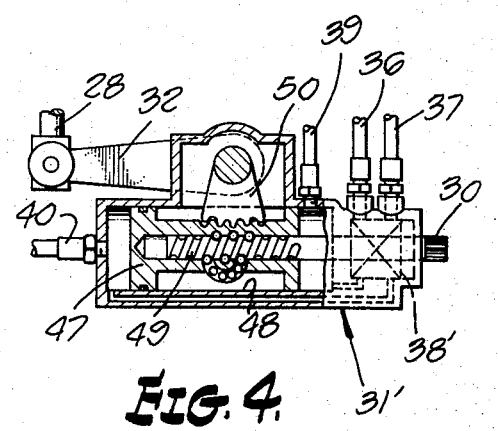
FIG. 4 is a fragmentary plan view showing details of a different type of power steering gear as utilized on the tow vehicle, and for use in combination with the trailer steering and stabilizing hydraulic cylinder, as shown in FIG. 3.

In FIG. 4, there is shown a different type of steering gear device 31' in which the steering control valve 38' is arranged to be operated directly by the shaft 30, rather than being mounted externally of the device, as in FIG. 2. The valve in this case is of the rotary type and is connected with the conduits 36 and 37 from the reservoir 35. The valve in this case controls the movement of a rack piston 47 within an associated cylinder 48. The piston has a worm connection 49 with the shaft 30 and a connection with the pitman 32 through a sector pinion 50. The steering gear devices are of conventional construction and per se do not comprise any part of the present invention, except insofar as these devices are utilized to control the steering cylinder actuator 16 of the trailer vehicle in synchronization with the power actuator cylinder 41 of the tow vehicle. In the case of the steering gear device 31', conduits 39 and 40 for controlling the power actuator cylinder 41 are connected with the opposite ends of the cylinder 48 so that the actuation of the power actuator cylinder 41 is synchronized with the operations of the valve 38' during steering.

The hydraulic line 22 is connected with conduit 39, and hydraulic line 24 is connected with conduit 40. As thus connected, it will be seen that the power actuators for steering the trailer and the towing vehicle operate in reversed order. That is, when the piston rod 20 of the trailer is being retracted, the piston rod 44 will be extended, and vice versa. As thus arranged, it will be apparent that if the steering wheel of the towing vehicle is turned, the steering control valve 38 or 38' will be opened so that the pressurized hydraulic fluid will be applied to the steering cylinder 41 of the towing vehicle. At the same time, the pressurized hydraulic fluid is conducted through the appropriate hydraulic line 22 or 24 to the steering cylinder 16 connected to the tongue of the trailer vehicle.

Due to the reversed operations of the cylinders 16 and 41, it will be seen that if the tow vehicle is steered so as to turn the front wheels to the left, the steering cylinder 16 will expand ad cause the trailer tongue and rear of the tow vehicle to move to the right. The tow vehicle and trailer thus become a synchronized unit, as the hydraulic pressure in the tow vehicle steering cylinder and the trailer steering cylinder are pressurized simultaneously with whatever pressure is necessary to steer the tow vehicle and trailer. In this type of power steering, the hydraulic pressure increases or decreases according to demand from approximately 0 to 1,000 P.S.I. When traveling in a straight line, the hydraulic pressure will be 0. Likewise, when guiding the tow vehicle so as to turn to the right, the trailer cylinder contracts and causes the rear of the tow vehicle and tongue of the trailer to move to the left. The trailer is thus steered around curves instead of being dragged as would be the case if the trailer steering cylinder were not provided. This relieves side drag on the rear of the tow vehicle and rear tires and lessens steering force required by front wheels of the tow vehicle. As a result, steering and stabilizing of the trailer is automatically accomplished when steering the tow vehicle in the regular course of its operation.

From the foregoing description and drawings, it will be clearly evident that the delineated objects and features of the invention will be accomplished.

Various modifications may suggest themselves to those skilled in the art without departing from the spirit of my invention, and, hence, I do not wish to be restricted to the specific forms shown or uses mentioned, except to the extent indicated in the appended claims.

I claim:

1. Mechanism for steerably controlling a towing vehicle having steerable wheels, and a coupled wheeled trailer vehicle, comprising:
   a. a fixed pulling tongue at the forward end of the trailer having a pivotal connection with a rear part of the towing vehicle;
   b. steering means on said towing vehicle, including a coupled mechanical steering linkage for guidingly actuating its steerable wheels;

c. a first double acting hydraulic power actuator cylinder-piston means operatively connected with said steering linkage;
d. a second double acting hydaulic power actuator cylinder-piston means operatively connected between points respectively on said pulling tongue and the rear part of the towing vehicle;
e. conduits comprising fluid flow connections between the opposite ends of the cylinders of said first and second cylinder-piston means such that, upon energization, the piston of one will be retracted when the piston of the other is extended;
f. a source of pressurized fluid on said towing vehicle; and
g. valve means on the towing vehicle for controlling flow of pressurized fluid to said conduit connections, said valve means being responsive to the actuation of said steering means.

2. Mechanism according to claim 1, wherein the connection point of the second power actuator means to the towing vehicle is offset relative to said pivot means.

3. Mechanism according to claim 1, wherein the valve means are operatively coupled to said steering linkage.

4. Mechanism according to claim 1, wherein the steering means includes a steering wheel shaft, and the valve means comprises a rotary valve operatively connected with said shaft.

5. Mechanism according to claim 1, in which the conduit connections with the second cylinder-piston means includes easily accessible break-away couplings.

* * * * *